United States Patent
Seth et al.

(10) Patent No.: US 9,077,617 B1
(45) Date of Patent: Jul. 7, 2015

(54) KERNEL-BASED TCP-LAYER ASSIST FOR FAST RECOVERY BY BACKUP CONTROL UNIT OF A DEVICE

(71) Applicant: Juniper Networks, Inc., Sunnyvale, CA (US)

(72) Inventors: Sameer Seth, Bangalore (IN); Pravin Bhandarkar, Bangalore (IN); Hannes Gredler, Pillberg (AT)

(73) Assignee: Juniper Networks, Inc., Sunnyvale, CA (US)

( * ) Notice: Subject to any disclaimer, the term of this patent is extended or adjusted under 35 U.S.C. 154(b) by 273 days.

(21) Appl. No.: 13/725,458

(22) Filed: Dec. 21, 2012

(51) Int. Cl.
*G01R 31/08* (2006.01)
*H04L 12/24* (2006.01)

(52) U.S. Cl.
CPC .................................. *H04L 41/0668* (2013.01)

(58) Field of Classification Search
CPC ....... H04L 45/28; H04L 69/40; H04L 69/163; H04L 69/16; H04L 45/58; H04L 45/60
USPC .......................... 370/219, 221, 331, 392, 401
See application file for complete search history.

(56) References Cited

U.S. PATENT DOCUMENTS

| | | | |
|---|---|---|---|
| 6,665,293 B2 | 12/2003 | Thornton et al. | |
| 6,853,617 B2 | 2/2005 | Watson et al. | |
| 7,236,453 B2 | 6/2007 | Visser et al. | |
| 7,269,133 B2 | 9/2007 | Lu et al. | |
| 7,292,535 B2 | 11/2007 | Folkes et al. | |
| 7,417,947 B1 | 8/2008 | Marques et al. | |
| 7,940,650 B1 * | 5/2011 | Sandhir et al. | 370/219 |
| 2003/0084161 A1 * | 5/2003 | Watson et al. | 709/227 |
| 2003/0210694 A1 | 11/2003 | Jayaraman et al. | |
| 2008/0088408 A1 | 4/2008 | Backman | |

* cited by examiner

*Primary Examiner* — Andrew Chriss
*Assistant Examiner* — Peter Mak
(74) *Attorney, Agent, or Firm* — Shumaker & Sieffert, P.A.

(57) ABSTRACT

In one example, a network device includes a plurality of interface cards to send and receive packets over a network, a primary control unit of the network device, and a secondary control unit of the network device configured to detect a failover event that causes the network device to failover from the primary control unit to the secondary control unit. An operating system of the secondary control unit may be configured to send, in response to detecting the failover event, a session maintenance message on each of a plurality of application-level communication sessions in accordance with a prioritized data structure having a plurality of hierarchically arranged nodes, each of the nodes associated with a different subset of the communication sessions having a common session timeout value.

21 Claims, 8 Drawing Sheets

KERNEL-BASED TCP-LAYER ASSIST FOR FAST RECOVERY BY BACKUP CONTROL UNIT OF A DEVICE

TECHNICAL FIELD

The disclosure relates to computer networks and, more particularly, to network devices that perform a switchover from a primary control unit to a secondary control unit.

BACKGROUND

A computer network is a collection of interconnected computing devices that exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Certain devices within the network, such as routers, maintain routing information that describes routes through the network. Each route defines a path between two locations on the network. From the routing information, the routers may generate forwarding information, which is used by the routers to relay packet flows through the network and, more particularly to relay the packet flows to a next hop. In reference to forwarding a packet, the "next hop" from a network router typically refers to a neighboring device along a given route. Upon receiving an incoming packet, the router examines information within the packet to identify the destination for the packet. Based on the destination, the router forwards the packet in accordance with the forwarding information.

Large computer networks, such as the Internet, often include many routers that exchange routing information according to a defined routing protocol, such as the Border Gateway Protocol (BGP). When two routers initially connect, the routers exchange routing information and generate forwarding information from the exchanged routing information. Particularly, the two routers initiate a routing communication "session" via which they exchange routing information according to the defined routing protocol. The routers continue to communicate via the routing protocol to incrementally update the routing information and, in turn, update their forwarding information in accordance with changes to a topology of the network indicated in the updated routing information. For example, the routers may send update messages to advertise newly available routes or routes that are no longer available.

According to some routing protocols, such as BGP, routers may determine a status of a communication session based on an elapsed time between received communications from a neighboring router. For example, a router may monitor the time between communications received from a neighboring router through the path defined by the session. The router may determine that the session has failed in response to determining that the time between communications satisfies a threshold time (e.g., meets or exceeds the threshold). Accordingly, to verify the status of a routing communication session, routers may periodically send a message (e.g., a KEEPALIVE message) to a neighboring router at defined time intervals that are less than the threshold time (e.g., a hold time).

In the event one of the routers of a routing communication session detects a failure of the session, i.e., the session "goes down," the surviving router may select one or more alternative routes through the network to avoid the failed router and continue forwarding packet flows. In particular, the surviving router may update internal routing information to reflect the failure, perform route resolution based on the updated routing information to select one or more alternative routes, update its forwarding information based on the selected routes, and send one or more update messages to inform peer routers of the routes that are no longer available. In turn, the receiving routers update their routing and forwarding information, and send update messages to their peers. This process continues and the update information propagates outward until it reaches all of the routers within the network. Routing information in large networks may take a long period of time to converge to a stable state after a network fault due to temporary oscillations, i.e., changes that occur within the routing information until it converges to reflect the current network topology. These oscillations within the routing information are often referred to as "flaps," and can cause significant problems, including intermittent loss of network connectivity and increased packet loss and latency.

To reduce the impact of failures, some routers include a primary routing control unit and a secondary routing control unit. In the event the primary routing control unit fails, the secondary routing control unit assumes the responsibility of forwarding packet flows. During failover from the primary routing control unit to the secondary routing control unit, a significant period of time may elapse before the secondary routing control unit reaches a state in which it is able to process and forward packets. During this period, network traffic may be queued or lost.

SUMMARY

In general, this disclosure describes techniques for maintaining communication sessions between network devices during failover from a primary control unit to a backup control unit of a network device. In the event of a graceful switchover from the primary control unit to the backup control unit due to, for example, failure of the primary control unit, the communication sessions are maintained and the backup control unit transparently takes control of the communication sessions. Data communications sent or received by applications associated with the communication sessions is transparently replicated from the primary control unit to the secondary control unit prior to any switchover event. The secondary control unit constructs and maintains replicated communication sessions (e.g., sockets) so as to mimic the communication sessions of the primary control unit.

In accordance with the techniques, in the event of a failover, an operating system of the secondary control unit intervenes on behalf of the applications and provides initial session maintenance messages (e.g., KEEPALIVE messages) to ensure the communication sessions are maintained during the switchover transition while the applications on the secondary control unit takeover functional responsibility for the network device. For example, the secondary control unit maintains a data structure that associates each of the communication sessions with a respective session timeout value (e.g., hold time). Each session timeout value represents a time duration that, upon expiration without transmittal of a communication message by the network device to a peer device over the associated communication session (e.g., socket), causes the peer device to terminate the communication session. In some examples, the secondary control unit organizes the data structure according to hierarchically arranged nodes, each of the nodes associated with a different subset of the communication sessions having a common session timeout value (e.g., hold time "buckets"). Each of the nodes includes a list of communication sessions having a common session timeout value associated with the node. The list of communication sessions within each node is maintained in an ordered arrangement in accordance with a length of time since a last transmission on each of the communication sessions. For instance, communication sessions within a node that are closer to expiration of a session timeout value (i.e., a greater length of time since a last transmission on the communication session) may be associated with a higher priority than communication sessions associated with more recent outbound communication over the communication session. As another example, for a given node, communication sessions associated with application-level processes having a higher execution priority may be prioritized over other communication sessions for that node.

During failover from the primary control unit to the secondary control unit, the secondary control unit directs the cleanup and activation of sockets at a kernel level (e.g., on a high-priority thread of the operating system), thereby reducing or minimizing the time window to invoke and/or bypass socket cleanup at the application layer and reducing impact on application layer operation. In addition, during failover, the secondary control unit traverses the data structure that associates each of the communication sessions with the respective timeout value to transmit session maintenance messages (e.g., KEEPALIVE messages) according to the ordered arrangement of the data structure. In this way, the secondary control unit transmits session maintenance messages in an ordered manner based on communication session activity to minimize the effect of failover on session timeouts, thereby helping to ensure that communication sessions are maintained during failover.

The techniques described herein may enable a network device, such as a router, to perform graceful switchover between control units within tight timing budgets and in a prioritized manner, thereby achieving non-stop routing. In the event of a failover, a router implementing these techniques may be able to continue to forward packets without downtime and in a manner that avoids routing session reestablishment, thus avoiding route flapping by peer routers.

In one example, a method includes detecting, with a secondary control unit of a network device, a failover event that causes the network device to failover from a primary control unit of the network device to the secondary control unit. The method further includes, in response to detecting the failover event, sending, with an operating system of the secondary control unit, a session maintenance message on each of a plurality of application-level communication sessions in accordance with a prioritized data structure having a plurality of hierarchically arranged nodes, each of the nodes associated with a different subset of the communication sessions having a common session timeout value.

In another example, a network device includes a plurality of interface cards to send and receive packets over a network, and a primary control unit of the network device and a secondary control unit of the network device configured to detect a failover event that causes the network device to failover from the primary control unit to the secondary control unit. An operating system of the secondary control unit is configured to send, in response to detecting the failover event, a session maintenance message on each of a plurality of application-level communication sessions in accordance with a prioritized data structure having a plurality of hierarchically arranged nodes, each of the nodes associated with a different subset of the communication sessions having a common session timeout value.

In another example, a computer-readable storage medium includes instructions that, when executed, cause at least one processor of a network device to detect, with a secondary control unit of the network device, a failover event that causes the network device to failover from a primary control unit of the network device to the secondary control unit, and in response to detecting the failover event, send, with an operating system of the secondary control unit, a session maintenance message on each of a plurality of application-level communication sessions in accordance with a prioritized data structure having a plurality of hierarchically arranged nodes, each of the nodes associated with a different subset of the communication sessions having a common session timeout value.

The details of one or more examples of the disclosure are set forth in the accompanying drawings and the description below. Other features, objects, and advantages will be apparent from the description and drawings, and from the claims.

DETAILED DESCRIPTION

Figure 1:
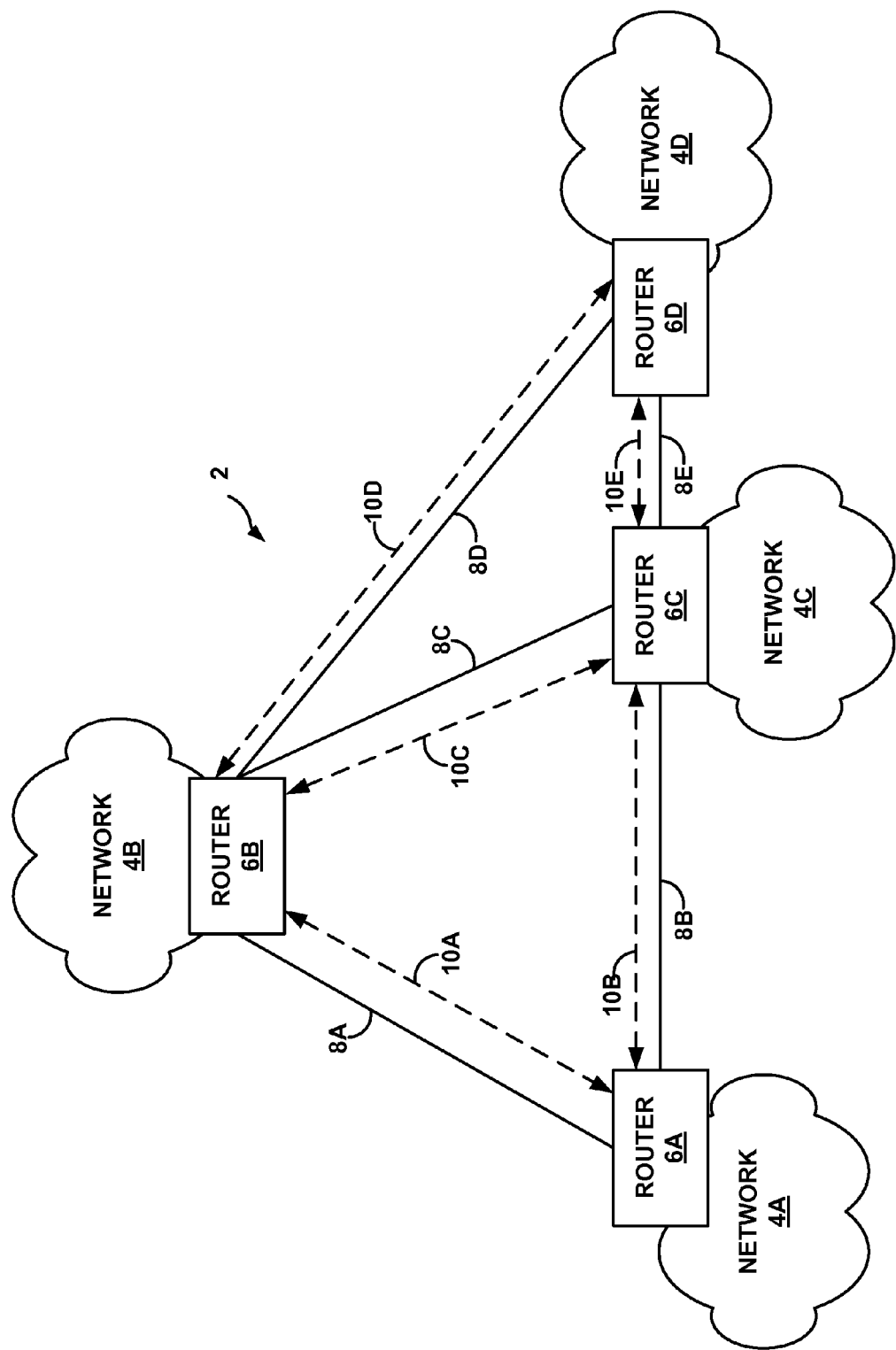
FIG. 1 is a block diagram illustrating an example computing network of routing devices interconnected by communication links.

FIG. 1 illustrates an exemplary computing network 2 formed by networks 4A-4D (collectively referred to herein as "networks 4") interconnected by communication links 8A-8E (collectively referred to herein as "communication links 8"). Each of networks 4 represents an independent administrative domain having a variety of networked resources capable of packet-based communication. For example, networks 4 may include internal networks having servers, workstations, network printers and faxes, gateways, routers, and the like. In this example, networks 4 include routers 6A-6D (collectively referred to herein as "routers 6") for sharing routing information and forwarding packets via communication links 8. That is, routers 6 maintain peer routing sessions 10A-10E (collectively referred to herein as "communication sessions 10") using communication links 8 and exchange messages conveying routing information in accordance with a routing protocol, such as the Border Gateway Protocol (BGP). While illustrated in the example of FIG. 1 with respect to routers 6, the techniques described herein are not so limited. That is, techniques of this disclosure are applicable to other types of network devices, such as network switches, network controllers, network appliances and other devices that utilize one or more backup control units.

The messages communicated over communication sessions 10 typically advertise and withdraw routes for reaching destinations within network 2. In the event of a network topology change, such as link failure or failure of one of routers 6, any of the routers detecting the change issues routing messages informing the other routers of the affected routes. In response, routers 6 select new routes for reaching the destinations within network 2. As one example, router 6A may determine a route from router 6A to router 6D that includes a path through router 6C. In the event of a failure of router 6C, router 6A may reconfigure its routing information to avoid router 6C, such as a path from router 6A through router 6B to router 6D.

In addition, the messages communicated over communication sessions 10 may include session maintenance messages in accordance with one or more routing protocols executed by routers 6, such as BGP, Label Distribution Protocol (LDP), Multicast Source Discovery Protocol (MSDP), Protocol-Independent Multicast (PIM), Open Shortest Path First (OSPF), Intermediate System To Intermediate System (IS-IS), and the like. For example, routers 6 may transmit session maintenance messages to verify a status of a peer-router communication session between routers 6. For instance, one or more of communication sessions 10 between routers 6 may include an associated session timeout value. The session timeout value corresponds to a time duration that, upon expiration without receipt of a communication message from a peer router over the associated communication session 10, causes the router to terminate the communication session. As such, in accordance with a routing protocol, routers engaged in a communication session may transmit periodic session maintenance messages at a time interval that is less than the session timeout value to maintain the communication session.

As one example, router 6A and router 6C may initiate a communication session 10B over a communication link 8B using the BGP protocol. In accordance with the BGP protocol, the communication session may be associated with a session timeout value (e.g., hold time), such as three seconds, five seconds, ten seconds, or other durations of time. In some examples, routers 6A and 6C negotiate the session timeout value upon initiation of the BGP communication session (e.g., socket). In other examples, the session timeout value is predefined by one or more of routers 6A and 6C.

Routers 6A and 6C each transmit session maintenance messages (e.g., BGP KEEPALIVE messages) over the socket defined by communication session 10B at periodic intervals that are less than the session timeout value. For instance, in examples where the session timeout value associated with communication session 10B between router 6A and 6C is three seconds, each of routers 6A and 6C may transmit BGP KEEPALIVE messages over the socket at periodic intervals, such as one third of the session timeout value (e.g., intervals of one second). In such an example, when router 6A does not receive any incoming communication from router 6C over the socket within a time duration that satisfies the three-second session timeout value (e.g., less than and/or equal to the session timeout value), router 6A terminates communication session 10B between routers 6A and 6C. Similarly, when router 6C does not receive any incoming communication (e.g., session maintenance message, update message, etc.) from router 6A over the socket within the three-second time duration, router 6C terminates communication session 10B between routers 6A and 6C. Such termination may result in the tear-down of the socket information at a socket layer of the control units of one or more of routers 6A and 6C, thereby requiring re-initialization and buildup of the socket to re-initiate the communication session at a later time.

In order to mitigate the effects on node failure and/or termination of communication sessions, one or more of routers 6 incorporate a primary routing engine and one or more secondary routing engines to assume routing responsibilities in the event the primary routing engine fails. In this way, a primary routing engine may be considered a primary control unit of the router, and a secondary (or backup) routing engine may be considered a secondary control unit of the router. As described herein, one or more of routers 6 provide graceful switchover from the primary routing engine to one of the secondary routing engines using replication of routing communication sessions, such as transmission control protocol (TCP) sockets. That is, data for the communication sessions (e.g., sockets) associated with the routing communication sessions on the primary routing engine is transparently replicated to the secondary routing engine in real-time (i.e., while the primary routing engine exchanges routing messages) prior to any switchover event.

The secondary routing engine constructs and maintains communication sockets so as to mimic the sockets currently used by the primary routing engine when communicating with the other routers 6. During a switchover from the primary routing engine to the secondary routing engine, the pre-established sockets on the secondary routing engine include all the information needed to ensure that the connections with the routing peers stay up and need not be reestablished. This information typically includes both any communication data queued in the socket buffer as well as any operating system (e.g., kernel) state data for the connection itself, such as, for instance, any TCP state.

For exemplary purposes, the techniques of this disclosure will be described in reference to router 6A. However, any or all of routers 6A-6D may operate in accordance with the techniques described herein. In this example, router 6A provides non-stop routing by including a primary routing engine as well as one or more standby routing engines (not shown). In the event of a failover, i.e. when the primary routing engine of router 6A fails or otherwise needs to be shut down, one of the standby routing engines assumes control over routing resources and routing functionality generally. Prior to the failover, the primary and standby routing engines synchronize their respective state information to allow the standby routing engine to assume control of the router resources without having to relearn state information. Moreover, a corresponding TCP socket is pre-established on the standby routing engine for each TCP socket currently in use by the primary routing engine for routing sessions.

For example, router 6A may engage in a routing session with, e.g., router 6B using a TCP socket. The routing session may be associated with a session timeout value, such as a hold time of three seconds, five seconds, ten seconds, thirty seconds, or other durations of time. As described above, the session timeout value may represent a time duration that, upon expiration without receipt of a communication message (e.g., KEEPALIVE message, update message, etc.) from a peer router within a time duration that satisfies the session timeout value (less than and/or equal to the session timeout value), causes the router to terminate the TCP socket.

Router 6A and router 6B may exchange routing messages over the TCP socket in accordance with a routing protocol, such as BGP. When router 6A receives a routing message from router 6B, the routing message is internally forwarded to the primary routing engine of router 6A for processing.

Before being fully processed by the primary routing engine and acknowledged, however, the received routing message is replicated and sent to the secondary routing engine of router 6A. Similarly, when router 6A outputs routing messages to router 6B via the TCP socket, the routing message to be sent is replicated and sent to the secondary routing engine. Upon receiving inbound or outbound routing messages, the secondary routing engine updates state information for its TCP socket corresponding to the TCP socket of the primary routing engine used for the communication session. In particular, the primary routing engine of router 6A may send replicated data to the secondary routing engine before the data is processed by a transport layer for the socket on the primary routing engine. For example, data may be replicated and communicated to the secondary routing engine before outbound data is packaged into a TCP packet (when sending data) by the transport layer or before an inbound packet is unpacked from a TCP packet (when receiving data) by the transport layer.

In some examples, router 6A may maintain a plurality of communication sessions 10 (e.g., TCP sockets), such as tens, hundreds, or thousands of communication sessions 10 between router 6A and a plurality of other network devices. In addition, each of the plurality of communication sessions 10 may be associated with one of a plurality of communication protocols. As such, router 6A may transmit multiple session maintenance messages corresponding to the plurality of communication sessions, whereby each session maintenance message is transmitted in accordance with a particular communication protocol at a periodic time interval based on the session timeout value associated with the communication session.

According to techniques described herein, the secondary routing engine constructs and maintains a data structure that includes a plurality of hierarchically arranged nodes, each of the nodes representing a different level within the data structure and being associated with a different subset of the communication sessions having a common session timeout value. That is, one or more of the communication sessions may be associated with a first session timeout value, such as, for example, three seconds. Similarly, one or more of the communication sessions maintained by router 6A may be associated with a second session timeout value, such as, for example, ten seconds. According to techniques of this disclosure, the secondary routing engine of router 6A generates a data structure, such as a linked list, that includes a plurality of nodes (e.g., hold time buckets). Each of the nodes is associated with a different session timeout value and is associated with communication sessions configured to use the session timeout value for that node. For instance, the secondary routing engine may generate a data structure that includes a first node associated with the first session timeout value (e.g., three seconds) and a second node associated with the second session timeout value (e.g., ten seconds).

The secondary routing engine generates and maintains the nodes of the data structure such that the nodes are hierarchically arranged in an ordered arrangement in accordance with the common session timeout value of the subset of communication sessions with which each respective node is associated. This ordered arrangement includes an ordering from a highest priority node corresponding to a shortest respective session timeout value to a lowest priority node corresponding to a longest respective session timeout value. For instance, in the above example including a first node corresponding to a first session timeout value of three seconds and a second node corresponding to a second session timeout value of ten seconds, the secondary routing engine maintains the nodes in an ordered arrangement corresponding to a highest priority associated with the first node to a lowest priority associated with a second node.

In one example, each of the nodes of the data structure is associated with a list of identifiers for a subset of the communication sessions, such as TCP sockets. Each communication session from the subset of communication sessions associated with a respective node is associated with a common session timeout value that is equal to the session timeout value of the node. The secondary routing engine generates and maintains the data structure such that the list of communication sessions associated with each node is maintained in an ordered arrangement in accordance with a length of time since a last transmission on each communication session. For instance, the ordered arrangement of communication sessions may include an ordering from a highest priority communication session corresponding to a longest time since the last transmission on the communication session to a lowest priority communication session corresponding to a shortest time since the last transmission on the communication session.

In this way, according to techniques described herein, the secondary routing engine generates a prioritized data structure having a plurality of hierarchically arranged nodes, each of the nodes associated with a different subset of communication sessions having a common session timeout value. Moreover, the secondary routing engine generates the prioritized data structure such that the nodes are arranged in a hierarchical ordering corresponding to a respective communication session timeout value, and the list of communication sessions associated with each node is maintained in a hierarchical ordering corresponding to communication activity of the respective session.

The secondary routing engine updates the prioritized data structure as new communication sessions (e.g., sockets) are initiated and as outbound communications are transmitted over each of the communication sessions. For example, in response to initiating a new communication session with one of routers 6, router 6A identifies the session timeout value associated with the new session. The primary routing engine of router 6A replicates the new communication session information to the secondary routing engine of router 6A. The secondary routing engine traverses the prioritized data structure to determine whether the data structure includes a node that corresponds to the session timeout value of the new communication session. If a node of the data structure corresponds to the session timeout value, the secondary routing engine inserts the communication session information into the list of communication sessions associated with the node such that the ordered arrangement of communication sessions corresponding to session activity within the node is maintained. For instance, the secondary routing engine may insert the new communication session information at the end of the list, indicating that the new communication session corresponds to a most recent outbound transmission on the communication session as compared to the other communication sessions included in the list. If the secondary routing engine determines that the prioritized data structure does not include a node that corresponds to the session timeout value associated with the new communication session, the secondary routing engine generates a new node corresponding to the new session timeout value. The secondary routing engine inserts the new node into the data structure such that the hierarchical arrangement of nodes is maintained. For instance, the secondary routing engine may insert the new node into the list of nodes (e.g., a linked list of nodes) such that the list of nodes, including the new node, is ordered from a highest priority node corresponding to a shortest respective session timeout value to a lowest priority node corresponding to a longest respective session timeout value.

Similarly, the secondary routing engine maintains the ordered arrangement of the subset of communication sessions associated with each node as outbound communication information associated with each session is replicated from the primary routing engine to the secondary routing engine. That is, as the primary routing engine transmits data over each socket and replicates the socket information to the secondary routing engine, the secondary routing engine maintains the prioritized data structure to reflect an ordering of the time of each transmission. For instance, in response to receiving replicated socket information indicating outbound communication over a socket, the secondary routing engine determines the node of the prioritized data structure with which the socket is associated. The secondary routing engine updates the list of sockets associated with the node to reflect the ordering of outbound communications over the sockets in accordance with a length of time since a last transmission on each of the sockets. For example, the secondary routing engine may update the list of sockets associated with the node to move a socket that is associated with a most recent transmission to the end of the list.

In the event that the primary routing engine of router 6A goes down, for example as a result of a failure or because software of the primary routing engine is to be updated, the secondary routing engine detects the event (e.g., by way of heartbeat signal or explicit message from the primary) and resumes control of all routing functions. Because the secondary routing engine has received all data that the primary routing engine has sent and received, the secondary routing engine may be able to continue the communication session without the necessity of a session restart. This data includes socket data replication (e.g., replication of inbound and outbound data) as well as TCP state synchronization between operating systems (e.g., kernels) executing in the different routing engines. For example, the secondary routing engine may keep track of sequence numbers of received packets and received acknowledgements for the corresponding socket. The secondary routing engine may also buffer sent data such that, if the primary routing engine fails at a time when sent data is not received by a peer recipient (as determined by whether the secondary routing engine has received an acknowledgement), the secondary routing engine may retransmit the data after taking control of routing duties. The secondary routing engine may also use TCP auto-update features upon taking control of routing duties for data that is being forwarded.

According to techniques described herein, in response to detecting a failover event that causes router 6A to failover from the primary routing engine to the secondary routing engine, an operating system of the secondary routing engine intervenes on behalf of application-level processes executing routing protocols to transmit initial session maintenance messages in accordance with the prioritized data structure. That is, the operating system traverses the prioritized data structure and sends session maintenance messages to ensure that communication sessions between router 6A and one or more other network devices are maintained during the switchover transition while applications on the secondary control unit takeover functional responsibility for packet forwarding by router 6A. After the initial session maintenance messages are transmitted over each communication session, the secondary control unit initiates operation as a primary control unit of router 6A, thereby passing functional responsibility for packet forwarding and transmission of session maintenance messages back to the application-level processes.

The operating system of the secondary routing engine traverses the prioritized data structure (e.g., on a high priority thread) to send the session maintenance messages in accordance with the hierarchical ordering of the data structure. That is, the secondary routing engine traverses the data structure in order from the highest priority node (e.g., corresponding to the shortest respective session timeout value) to the lowest priority node (e.g., corresponding to the longest respective session timeout value). At each node, the secondary routing engine traverses the list of communication sessions in order from the highest priority communication session (e.g., corresponding to the longest time since the last transmission on the communication session) to the lowest priority communication session (e.g., corresponding to the shortest time since the last transmission on the communication session). For each communication session of the list, the secondary routing engine updates socket state associated with the session, marks the socket as active, and transmits a session maintenance message according to the communication protocol associated with the session.

In this way, in response to detecting a failover event, the secondary routing engine transmits session maintenance messages in order from shortest session timeout value to longest session timeout value. In addition, for each common session timeout value (e.g., hold time bucket), the secondary routing engine transmits session maintenance messages in order from the communication session associated with a longest time since the last transmission on the session to the communication session associated with a shortest time since the last transmission on the session. As such, the operating system of the secondary routing engine transmits initial session maintenance messages on failover in a hierarchical manner to help ensure that communication sessions are maintained while applications executing routing protocols on the secondary routing engine take over functional routing responsibility for the network device. Accordingly, the techniques may enable a network device, such as a router, to perform graceful switchover between control units, thereby achieving non-stop routing in a manner that avoids communication session timeouts, thus avoiding route flapping by peer routers.

Figure 2:
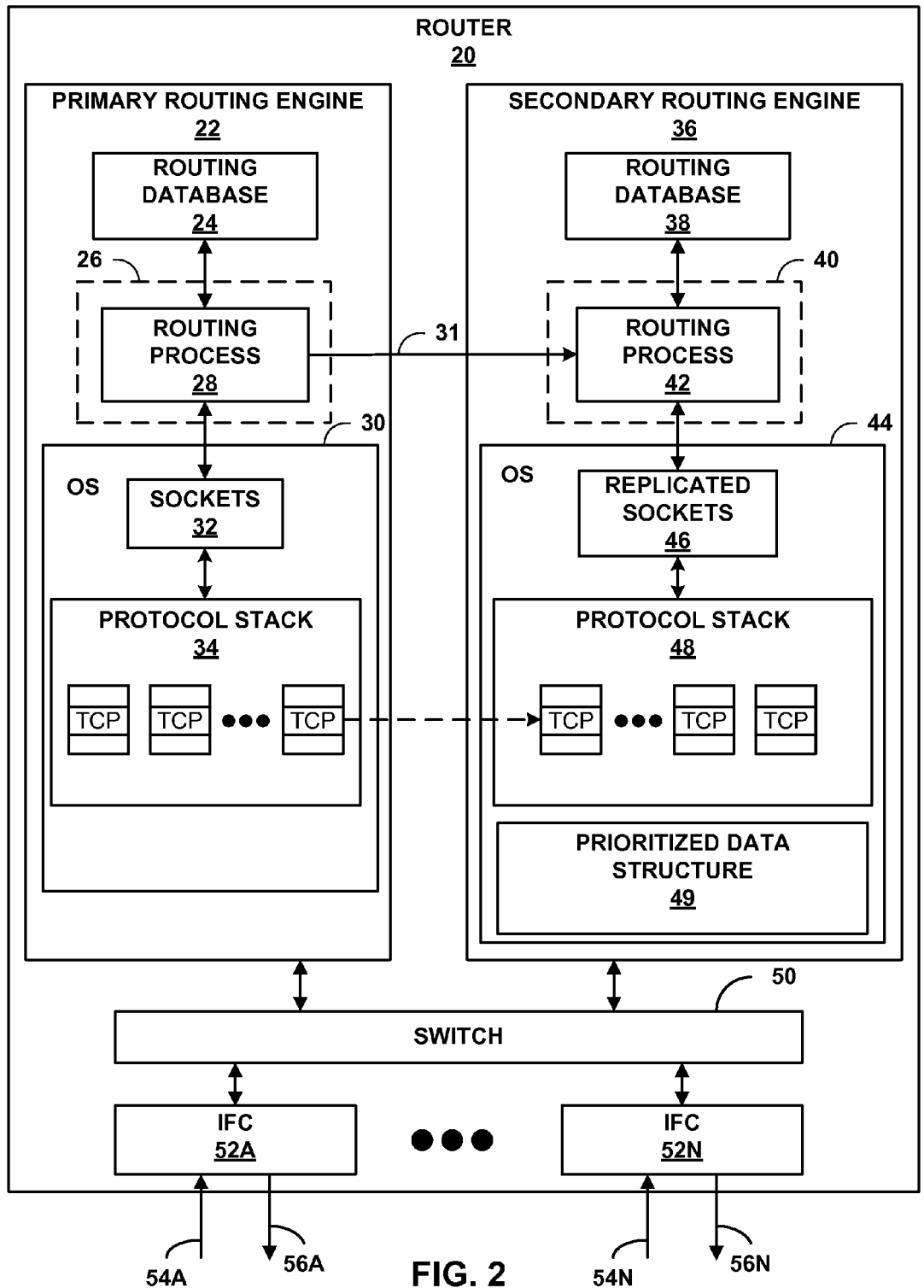
FIG. 2 is a block diagram illustrating an exemplary router in accordance with techniques described herein.

FIG. 2 is a block diagram illustrating an exemplary router 20 that may perform a graceful switchover from primary routing engine 22 to secondary routing engine 36 using the techniques described herein. Router 20 may, for example correspond to router 6A of FIG. 1.

In the exemplary embodiment of FIG. 2, router 20 includes primary routing engine 22 and secondary routing engine 36. In this manner, router 20 may be viewed as a network device having a primary control unit and a backup control unit. Primary routing engine 22 is responsible for maintaining routing database 24 to reflect the current topology of a network and other network entities to which router 20 is connected. That is, primary routing engine 22 provides an operating environment for execution of one or more applications 26 that implement one or more routing protocols to communicate with peer routers and periodically update routing database 24 to accurately reflect the topology of the network and the other network entities. For instance, as illustrated in FIG. 2, primary routing engine 22 may provide an operating environment for routing process (daemon) 28 that implements one or more such routing protocols. Applications 26 may include a plurality of applications executing asynchronously in accordance with a plurality of routing protocols, such as tens, hundreds, or thousands of applications that implement one or more routing protocols. Example protocols include routing and label switching protocols, such as BGP, mpBGP, IS-IS, OSPF, RIP, RSVP-TE and LDP. In a similar fashion, secondary routing engine 36 provides an operating environment for executing one or more applications 40 for maintaining routing database 38 in accordance with data received from primary routing engine 22.

In a typical architecture, router 20 includes interface cards (IFCs) 52A-52N ("IFCs 52") that receive packets on inbound links 54A-54N ("inbound links 54") and send packets on outbound links 56A-56N ("outbound links 56"). IFCs 52 are coupled to primary routing engine 22 and secondary routing engine 36 by high-speed switch 50. In another embodiment, router 20 may be a multi-chassis router in which multiple routing nodes are physically coupled and configured to operate as a single routing node. One example of a multi-chassis router includes multiple line card chassis (LCCs), which include one or more interface cards (IFCs) for sending and receiving packets, and a central switch control chassis (SCC), which provides top-down management of the LCCs.

One or more routing protocols implemented by routing process 28 establish peer routing sessions with other routers and, by way of these network communication sessions, exchange routing messages. As such, an operating system 30 executing within primary routing engine 22 implements kernel-level processes for handling data at various layers of the open systems interconnection (OSI) networking model (shown as protocol stack 34). OS 30 provides an API by which routing process 28 creates sockets 32 and establishes, for example, TCP/IP-based communication sessions for sending and receiving routing messages for each socket.

Sockets 32 are logical constructs having data structures and state data maintained by OS 30 of primary routing engine 22 and may be viewed as acting as interfaces between routing process 28 and protocol stack 34. For instance, sockets 32 may include one or more data structures that define data relating to one or communication sessions, such as a file descriptor of a socket, a thread identifier of the socket, an active/backup state of the socket, and a pointer to a TCP socket within protocol stack 34. Sockets are used herein as one common mechanism for establishing communication sessions between devices and the techniques described herein may be applied to any other type of communication session that utilizes which session maintenance messages.

Secondary routing engine 36 provides an operating environment for execution of routing process 42. Like routing process 28, routing process 42 implements one or more routing protocols and periodically updates routing database 38 to accurately reflect the topology of the network and the other network entities. That is, like routing process 28, routing process 42 sends and receives routing messages through replicated sockets 46, where each of the replicated sockets corresponds to one of sockets 32 currently in use for routing communications. Routing process 42 receives replicated routing messages from primary routing engine 22, updates routing database 38, and outputs routing messages as if it were handling all routing functions for router 20. Replicated sockets 46 of secondary routing engine 36 are logical constructs having data structures and state data maintained by OS 44 and act as an interface between routing process 42 and protocol stack 48, also of secondary routing engine 36. That is, like sockets 32, replicated sockets 46 may include one or more data structures that define data relating to one or communication sessions currently in use for routing communications, such as a socket file descriptor of a socket, a thread identifier of the socket, an active/backup state of the socket, and a pointer to a TCP socket within protocol stack 48.

The two instances of routing processes 28 and 42 may interact with each other using an out of band communication mechanism 31, such as a dedicated socket for exchanging data and control messages. This mechanism 31 is generally used for initial sync-up of network state and for exchanging replication socket handles allocated by the underlying operating systems. For example, upon opening a new routing session, routing process 28 interacts with operating system 30 to allocate a new socket and tags the socket (referred to as the "original socket") for replication by an API call to the operating system. The call causes operating system 30 to asynchronously set up the replication communications between protocol stacks 34 and 48.

In addition, upon opening a new routing session, routing process 28 may determine a session timeout value corresponding to the socket. As one example, the session timeout value may be predefined by primary routing engine 22, such as by one or more routing policies associated with the routing protocol. As another example, routing process 28 may negotiate the session timeout value with a routing process of a peer router of the session. Replication communications between protocol stacks 34 and 48 may include such a session timeout value associated with the socket. Upon receiving the replicated socket information, operating system 44 of secondary routing engine 36 stores the session timeout value associated with the socket in prioritized data structure 49, as further described below. Further, operating system 44 stores a session maintenance message protocol associated with the socket in the logical data structure of replicated sockets 46. In one example, routing process 42 passes a predefined identifier of the session maintenance message protocol, such as a predefined string, integer value, or other identifier, to replicated sockets 46 to uniquely identify the session maintenance message protocol associated with the socket. In another example, routing process 42 registers a callback function with operating system 44 to enable operating system 44 to transmit a session maintenance message associated with the socket upon detecting a failover event, as further described below.

After the replication has been initiated by the primary routing process 28, on the receive side of the original socket buffer, any data that is currently unread and any data that is received henceforth is replicated to the replicated socket of the secondary routing process 42. On the send side (i.e., outbound side), data subsequently sent (i.e., written to the original socket) will be replicated to the replicated socket of the secondary routing process 42.

In general, when router 20 receives inbound data destined for primary routing engine 22, e.g. a TCP/IP packet received from link 54A of IFC 50A that has a destination IP address matching that of the primary routing engine, the packet is transferred to primary routing engine 22 through switch 50. Protocol stack 34 provides a hierarchy of software layers that processes the packets. After processing the data at lower levels of the stack but before the data at the transport layer with respect the TCP elements of the packet, components within protocol stack 34 replicate the packet and send the replicated packet to protocol stack 48 of secondary routing engine 36. In one embodiment, protocol stack 34 may send the replicated packet to protocol stack 48 in the form of an IP packet over a dedicated internal network interconnect. Protocol stack 34 may also wait for an acknowledgement from protocol stack 48 of reception of the replicated packet, before processing the TCP portion of the packet and advancing the packet up the software stack.

Protocol stack 34 also includes components that monitor sockets 32 for outbound data received from routing process 28. When routing process 28 pushes application-layer data for a routing protocol to sockets 32, protocol stack 34 may retrieve the data from socket 28. Before processing the application-layer routing data into one or more TCP packets, upper-level components within protocol stack 34 (i.e., components above the transport level) intercept the application-layer data, replicate the data and send the replicated data to upper-level components within protocol stack 48 of secondary routing engine 36. When protocol stack 48 receives data sent by routing process 28 of primary routing engine 22, protocol stack 48 replicates the outbound data and pushes the data to a corresponding send socket of replicated sockets 46. In response, protocol stack 48 processes the application-layer data to update various TCP-related state data of protocol stack 48 as if the data were sent out the corresponding replicated send socket. Further details of an example technique for replicating data between protocol stacks of an active control unit and a backup control unit are described in U.S. Pat. No. 7,940,650, the entire content of which is incorporated herein by reference.

As illustrated in FIG. 2, operating system 44 of secondary routing engine 36 constructs and maintains prioritized data structure 49. Prioritized data structure 49 includes a plurality of hierarchically arranged nodes, each of the nodes associated with a different subset of replicated sockets 46 having a common session timeout value. Operating system 44 generates and maintains prioritized data structure 49 in an ordered arrangement of the nodes in accordance with the common session timeout value of the subset of the communication sessions with which each respective node is associated. For example, operating system 44 may generate prioritized data structure 49 as a linked list, each node of the linked list corresponding to a different session timeout value. Operating system 44 maintains prioritized data structure 49 such that the nodes of the list corresponding to the session timeout values are ordered from a highest priority node corresponding to a shortest respective session timeout value to a lowest priority node corresponding to a longest respective timeout value.

Each node of prioritized data structure 49 includes a sub-list of replicated sockets. Operating system 44 maintains prioritized data structure 49 such that each of the sockets of a sub-list corresponding to a node is associated with a session timeout value that is equal to the session timeout value associated with the node. As an example, operating system 44 may maintain each sub-list of sockets as a linked list, whereby each node of the linked list of sockets corresponds to a different replicated socket. Operating system 44 maintains prioritized data structure 49 such that each sub-list of sockets is arranged in accordance with a length of time since a last transmission on each of the sockets. For example, operating system 44 may arrange each sub-list of sockets in a monotonic order according to a length of time since a last transmission over the socket. For instance, operating system 44 may maintain a sub-list of replicated sockets such that a first node of the list corresponds to a replicated socket having a longest time since a last transmission over the socket and a last node of the list corresponds to a replicated socket having a shortest time since a last transmission over the socket. Similarly, each node of the list of replicated sockets may be arranged according to a length of time since a last transmission over the socket, such that the list of sockets is monotonic with respect to the last transmission time over each of the replicated sockets.

Operating system 44 maintains the hierarchical arrangement of prioritized data structure 49 as secondary routing engine 36 receives replicated socket information from primary routing engine 22. For example, upon receiving replicated socket information corresponding to a newly-initiated communication session, operating system 44 determines whether a node of prioritized data structure 49 corresponds to a session timeout value associated with the newly-initiated session. If a node of prioritized data structure 49 corresponds to the session timeout value of the newly-initiated session, operating system 44 inserts the replicated socket into the sub-list of replicated sockets associated with the node such that the ordered arrangement of the sub-list is maintained with respect to outbound session activity. If operating system 44 determines that no node of prioritized data structure 49 corresponds to the session timeout value of the newly-initiated session, operating system 44 generates a new node of prioritized data structure 49 corresponding to the new session timeout value. In addition, operating system 44 inserts the new node into prioritized data structure 49 such that the hierarchical ordering of the nodes is maintained with respect to the associated session timeout values.

In some examples, secondary routing engine 36 may detect a failover event that causes router 20 to failover from primary routing engine 22 to secondary routing engine 36. For instance, primary routing engine 22 may transmit a heartbeat signal to secondary routing engine 36 using out of band communication mechanism 31 or other inter-component communication mechanism. Secondary routing engine 36 may, in certain examples, determine a failover event in response to a failure to receive such a heartbeat signal for a threshold amount of time.

In response to detecting a failover event, operating system 44 of secondary routing engine 36 intervenes (e.g., on a high priority thread) to transmit initial session maintenance messages over protocol stack 48 to help ensure that the communication sessions defined by replicated sockets 46 are maintained. That is, operating system 44 assumes responsibility from applications 40 for sending initial session maintenance messages over replicated sockets 46. In particular, operating system 44 traverses prioritized data structure 49 to perform socket cleanup (e.g., mark the socket as active) and transmit a session maintenance message in accordance with the hierarchical arrangement of prioritized data structure 49.

In response to detecting the failover event, operating system 44 traverses the nodes of prioritized data structure 49 that correspond to the common session timeout values (e.g., a linked list) in an order from the highest priority node (e.g., corresponding to the shortest respective session timeout value) to the lowest priority node (e.g., corresponding to the longest respective session timeout value). At each node, operating system 44 traverses the sub-list of one or more replicated sockets in order from a highest priority replicated socket (e.g., corresponding to a longest time since a last transmission over the socket) to a lowest priority replicated socket (e.g., corresponding to a shortest time since a last transmission over the socket). For each replicated socket in the sub-list, operating system 44 updates the associated information in replicated sockets 46 to mark the associate socket as active and transmit a session maintenance message over the socket in accordance with the corresponding session maintenance message protocol.

After session maintenance messages are transmitted over each of replicated sockets 46 according to prioritized data structure 49, secondary routing engine 36 initiates operation as a primary routing engine of router 20. That is, after operating system 44 intervenes to assume responsibility from applications 40 for sending initial session maintenance messages, secondary routing engine 36 initiates operation as a primary routing engine of router 20, thereby passing functional responsibility for packet forwarding and transmission of session maintenance messages to applications 40. In this way, operating system 44 intervenes to transmit initial session maintenance messages over each of replicated sockets 46 in a hierarchical order from highest priority to lowest priority, thereby helping to ensure that a peer router does not terminate the communication sessions. As such, according to techniques described herein, a network device, such as a router, may perform graceful switchover between control units, thereby achieving non-stop routing in a manner that avoids communication session timeouts.

Figure 3A:
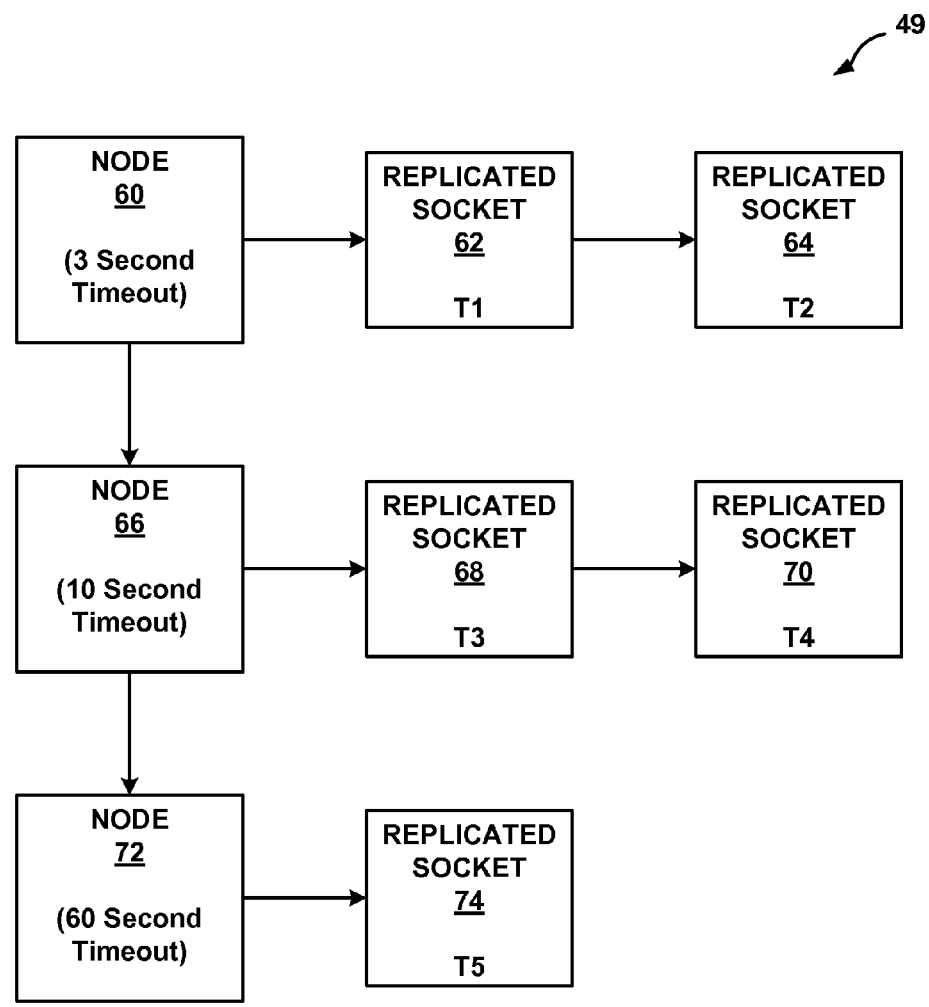
FIGS. 3A-3D are block diagrams illustrating examples of a prioritized data structure that may be used for graceful switchover from a primary control unit to a secondary control unit of a network device in accordance with techniques described herein.

FIGS. 3A-3D are block diagrams illustrating examples of prioritized data structure 49 that may be used for graceful switchover from a primary control unit to a secondary control unit of a network device in accordance with techniques described herein. As illustrated in FIG. 3A, operating system 44 of secondary routing engine 36 generates and maintains prioritized data structure 49 having a plurality of hierarchically arranged nodes. While prioritized data structure 49 is illustrated in the example of FIG. 3A as including three hierarchically arranged nodes 60, 66, and 72, it should be appreciated that, in certain examples, prioritized data structure 49 may include more or less than three nodes, such as one node, two nodes, ten nodes, one hundred nodes, one thousand nodes, or other numbers of nodes.

As illustrated in FIG. 3A, operating system 44 of secondary routing engine 36 maintains nodes 60, 66, and 72 in an ordered arrangement in accordance with a common session timeout value of the subset of communication sessions (e.g., sockets) with which each respective node is associated. For instance, in the example of FIG. 3A, node 60 is associated with a session timeout value of three seconds. Each of replicated sockets 62 and 64 has a common session timeout value of three seconds. Similarly, node 66 is associated with a session timeout value of ten seconds, each of replicated sockets 68 and 70 having a common session timeout value of ten seconds. Finally, node 72 is associated with a session timeout value of sixty seconds. Replicated socket 74, in this example, has a session timeout value of sixty seconds.

In some examples, operating system 44 maintains prioritized data structure 49 as a linked list of nodes (e.g., nodes 60, 66, and 72). Each of the nodes may include a sub-list (e.g., a linked list) of communication sessions, such as replicated sockets, that are associated with a common session timeout value that is equal to the session timeout value of the respective node. Operating system 44 maintains the list of nodes in an ordered arrangement from a highest priority node corresponding to a shortest respective session timeout value to a lowest priority node corresponding to a longest respective session timeout value. As illustrated in FIG. 3A, operating system 44 maintains prioritized data structure 49 such that nodes 60, 66, and 72 are arranged in an ordering from highest priority node 60 corresponding to a three second session timeout value to the next highest priority node 66 corresponding to a ten second session timeout value to the lowest priority node 72 corresponding to a sixty second session timeout value.

For each of nodes 60, 66, and 72, operating system 44 arranges the sub-list of replicated sockets associated with each respective node in an ordered arrangement in accordance with a length of time since a last transmission on each of the replicated sockets. For instance, in the example of FIG. 3A, node 60 is associated with a sub-list of replicated sockets 62 and 64. Each of replicated sockets 62 and 64 is associated with a time (e.g., a timestamp) at which a last transmission (e.g., session maintenance message, update message, etc.) was sent over the associated socket of protocol stack 34 of primary routing engine 22. In this example, replicated socket 64 is associated with last transmission time T2 and replicated socket 62 is associated with last transmission time T1, where time T2 is more recent than time T1.

As illustrated, operating system 44 maintains the sub-list of replicated sockets 62 and 64 associated with node 60 such that replicated socket 64, associated with a more recent last transmission time T2 than replicated socket 62 associated with last transmission time T1, is positioned within the ordered list after replicated socket 62. While the illustrated example of FIG. 3A includes two replicated sockets 62 and 64 associated with node 60, in certain examples, more than two replicated sockets may be associated with node 60, such as three replicated sockets, ten replicated sockets, one hundred replicated sockets, or other numbers of replicated sockets. In this way, operating system 44 maintains prioritized data structure 49 such that a subset of replicated communication sessions associated with a node of prioritized data structure 49 is ordered in accordance with a length of time since a last transmission on each communication session.

Similarly, in the example of FIG. 3A, node 66 is associated with a sub-list of replicated sockets 68 and 70. In this example, each of replicated sockets 68 and 70 is associated with a session timeout value of ten seconds. Replicated socket 68 is associated with last transmission time T3 and replicated socket 70 is associated with last transmission time T4, where time T4 is more recent than time T3. That is, in this example, a greater length of time has elapsed since a last transmission over the socket of protocol stack 34 of primary routing engine 22 with which replicated socket 68 is associated than has elapsed since a last transmission over the socket of protocol stack 34 with which replicated socket 70 is associated. As such, the communication session associated with replicated socket 68 is, in this example, closer to expiration of the session timeout value than is the communication session associated with replicated socket 70. Operating system 44 maintains prioritized data structure 49 such that the subset of replicated communication sessions associated with a node of prioritized data structure 49 is arranged in an ordering from a highest priority corresponding to a longest time since a last transmission on the communication session to a lowest priority corresponding to a shortest time since a last transmission on the communication session.

As further illustrated in FIG. 3A, node 72 is associated with replicated socket 74 having a session timeout value of sixty seconds. In this example, replicated socket 74 is associated with a last transmission time T5. While last transmission times (e.g., last transmission times T1-T5) are illustrated in the example of FIGS. 3A-3D as including a numerical ordering within a respective node, it should be understood that no such ordering of last transmission times is implied as between respective nodes. For instance, while replicated socket 68 associated with node 66 is, in this example, associated with last transmission time T3, last transmission time T3 is not necessarily more recent than last transmission time T2 (i.e., the last transmission time of replicated socket 64 associated with node 60). In some examples, last transmission time T3 may be less recent than last transmission time T2. In other examples, last transmission time T3 may be more recent than last transmission time T2.

Figure 3B:
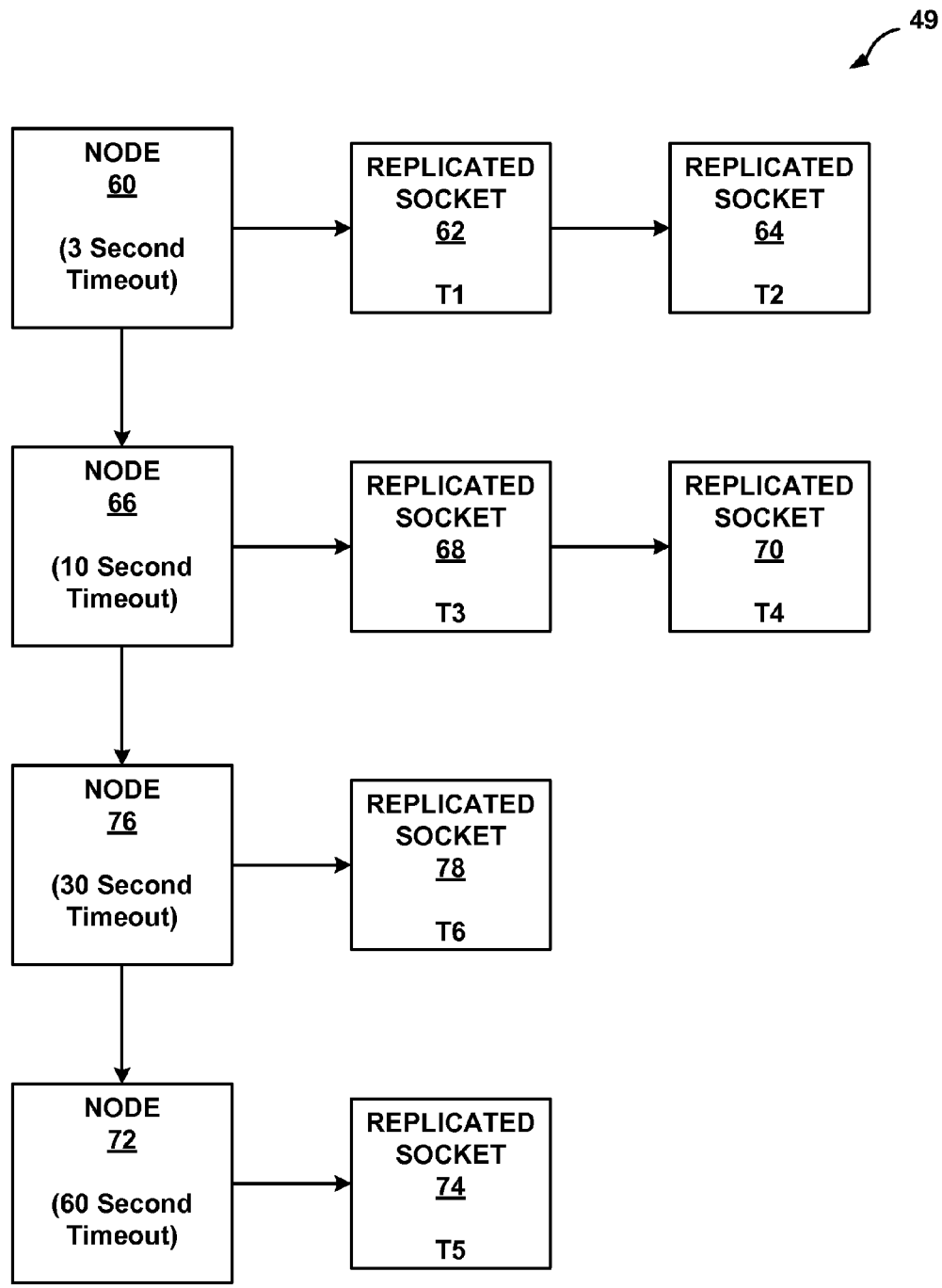

As illustrated in FIG. 3B, operating system 44 may generate a new node within prioritized data structure 49 such that the hierarchical arrangement of nodes corresponding to common session timeout values is maintained. For example, operating system 44 may receive replicated socket information from routing process 28 of primary routing engine 22 corresponding to replicated socket 78. In this example, replicated socket 78 is associated with a session timeout value of thirty seconds. Operating system 44 traverses prioritized data structure 49 to determine whether a node of prioritized data structure 49 corresponds to a session timeout value of thirty seconds. In the example of FIG. 3B, operating system 44 traverses nodes 66, 66, and 72 of prioritized data structure 49 and determines that none of nodes 60, 66, and 72 corresponds to a session timeout value of thirty second. In response to determining that prioritized data structure 49 does not include a node that corresponds to the session timeout value of thirty seconds with which replicated socket 78 is associated, operating system 44 generates new node 76 within prioritized data structure 49, the new node corresponding to the new session timeout value of thirty seconds.

Operating system 44 generates node 76 within prioritized data structure 49 such that the ordered arrangement of nodes, including node 76, is maintained with respect to the common session timeout value of the subset of communication sessions with which each respective node is associated. For example, as illustrated, operating system 44 generates node 76 within prioritized data structure 49 such that node 76 (i.e., corresponding to a thirty-second session timeout value) is positioned between node 66 (i.e., corresponding to a ten-second session timeout value) and node 72 (i.e., corresponding to a sixty-second session timeout value). In this way, operating system 44 maintains the hierarchical arrangement of prioritized data structure 49 as socket information is replicated from routing process 28 of primary routing engine 22 to routing process 42 of secondary routing engine 36.

Figure 3C:
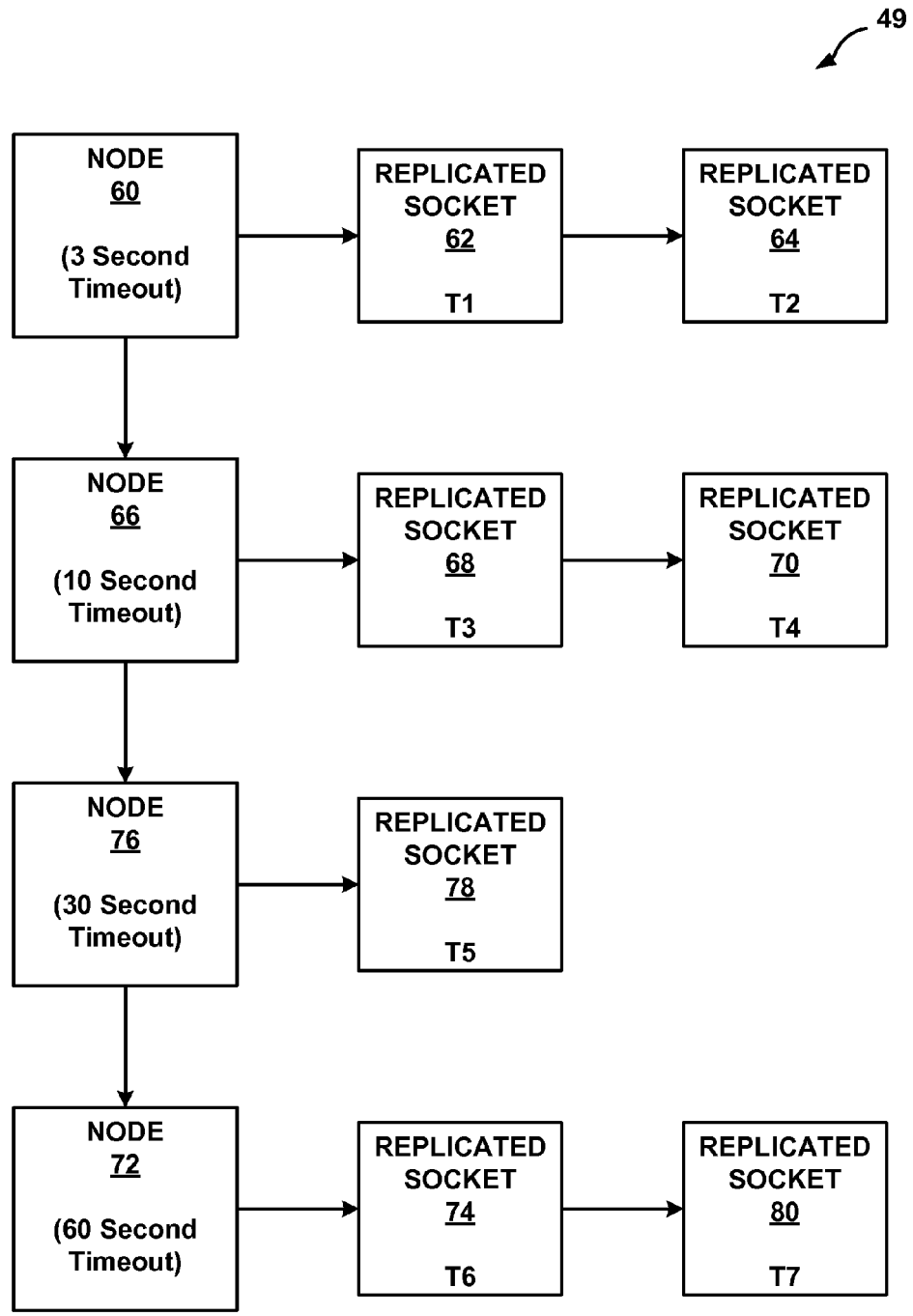

In the example of FIG. 3C, operating system 44 generates a new replicated socket 80 within the subset of replicated sockets with which node 72 is associated. Operating system 44 generates the new replicated socket 80 within the subset of replicated sockets such that the ordered arrangement of sockets with respect to the length of time since a last transmission on each of the sockets is maintained. That is, operating system 44 may receive replicated socket information from routing process 28 of primary routing engine 22 corresponding to replicated socket 80. In this example, replicated socket 80 is associated with a session timeout value of sixty seconds.

Operating system 44 traverses prioritized data structure 49 to determine whether any of the nodes of prioritized data structure (e.g., nodes 60, 66, 72, and 76) correspond to a session timeout value of sixty seconds. In response to determining that node 72 corresponds to a session timeout value of sixty seconds, operating system 44 updates the sub-list of replicated sockets that are associated with node 72 to include replicated socket 80. In addition, operating system 44 updates the sub-list of replicated sockets associated with node 72 such that the ordering of replicated sockets associated with node 72 with respect to a length of time since a last transmission on the respective socket is maintained. For instance, in the example of FIG. 3C, replicated socket 80 is associated with last transmission time T7, where time T7 is more recent than time T6 with which replicated socket 74 is associated. In this way, operating system 44 generates new replicated sockets within prioritized data structure 49 and maintains the hierarchical ordering of replicated sockets associated with each node of prioritized data structure 49 as socket information is replicated from routing process 28 of primary routing engine 22 to routing process 42 of secondary routing engine 36.

Figure 3D:
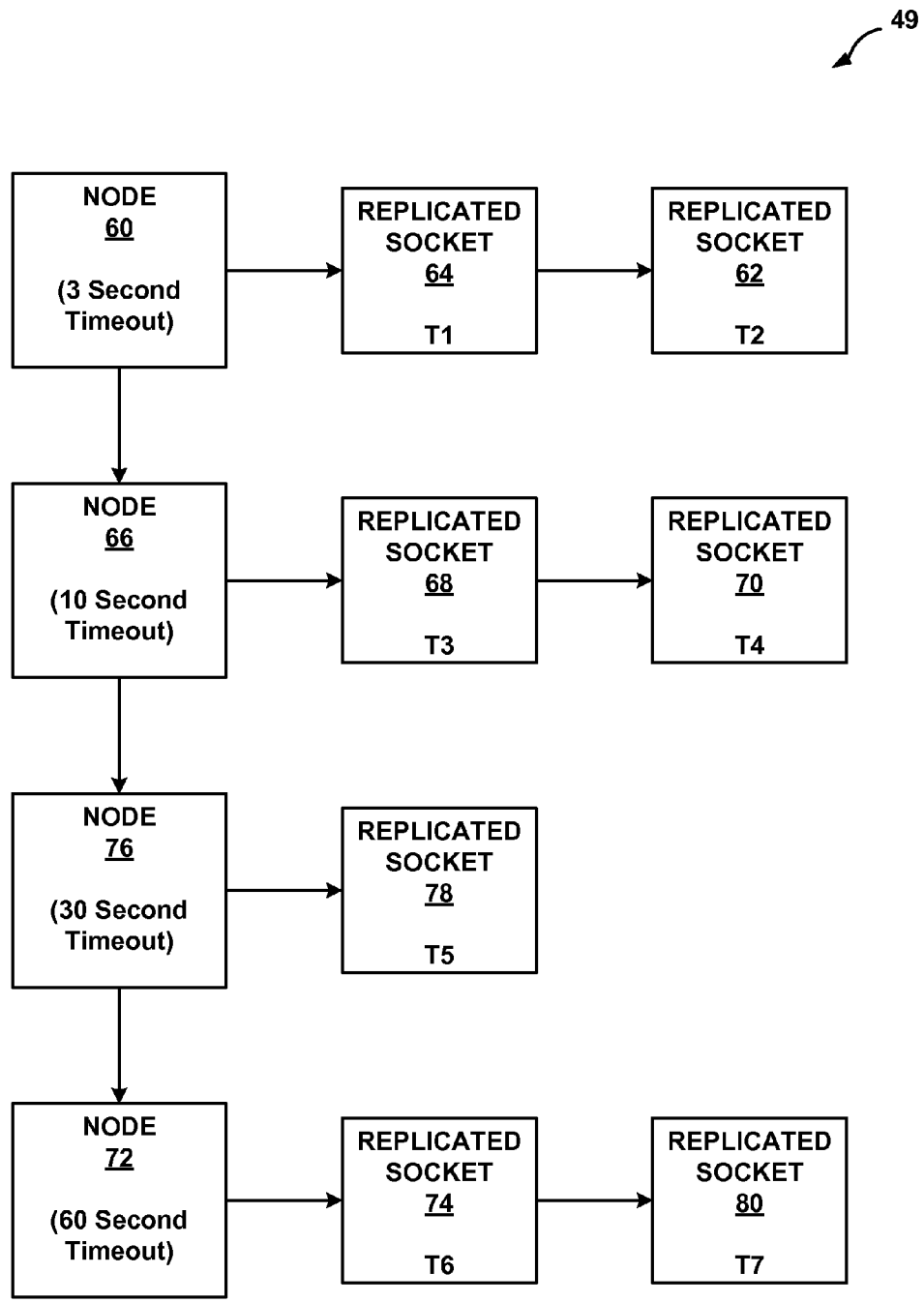

In the example of FIG. 3D, as socket information is replicated to routing process 42 of secondary routing engine 36, operating system 44 maintains prioritized data structure 49 to arrange replicated sockets 62 and 64 in an ordered arrangement in accordance with a length of time since a last transmission on each of replicated sockets 62 and 64. As illustrated, replicated socket 64 is associated with a last transmission time T1 and replicated socket 62 is associated with a last transmission time T2, where time T2 is more recent than time T1. Operating system 44 receives replicated socket 62 and updates the list of replicated sockets 64 and 62 associated with node 60 such that the list is arranged from highest priority replicated socket (i.e., replicated socket 64) corresponding to a longest time since the last transmission on the socket (e.g., last transmission time T1) to a lowest priority replicated socket (i.e., replicated socket 62) corresponding to a shortest time since the last transmission on the socket (i.e., last transmission time T2).

Figure 4:
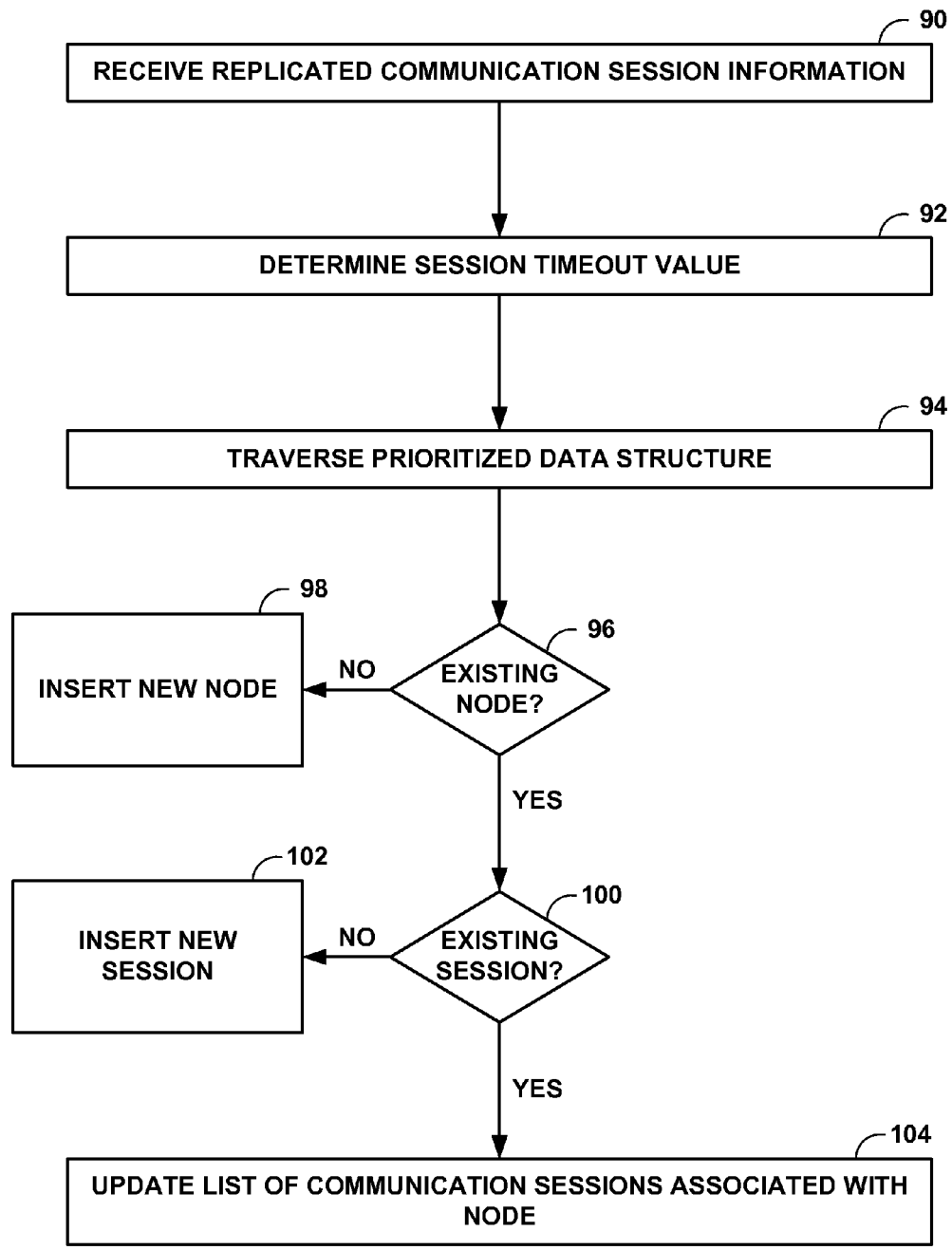
FIG. 4 is a flow diagram illustrating example operations for generating and maintaining a prioritized data structure that may be used to perform graceful switchover from a primary control unit to a secondary control unit of a network device in accordance with techniques described herein.

FIG. 4 is a flow diagram illustrating example operations for generating and maintaining a prioritized data structure that may be used to perform graceful switchover from a primary control unit to a secondary control unit of a network device in accordance with techniques described herein. For purposes of illustration only, the example operations are described below within the context of router 20, as shown in FIG. 2.

Operating system 44 of secondary routing engine 36 receives replicated communication session information (e.g., replicated sockets 46) from primary routing engine 22 (90). As an example, replicated sockets 46 may include information such as a file descriptor of a socket, a thread identifier of the socket, an active/backup state of the socket, and a pointer to a TCP socket within protocol stack 48 of operating system 44. Operating system 44 determines a session timeout value associated with the communication session (92). The session timeout value represents a time duration that, upon expiration without receipt of a communication over the session by a peer router within a threshold amount of time (e.g., three seconds, ten seconds, thirty seconds, etc.), causes the peer router to terminate the communication session. Operating system 44 traverses prioritized data structure 49 (94) to determine whether a node of prioritized data structure 49 corresponds to the session timeout value associated with the session (96).

When operating system 44 determines that no node of prioritized data structure 49 corresponds to the session timeout value ("NO" branch of 96), operating system 44 inserts a new node into prioritized data structure 49, the new node corresponding to the session timeout value (98). Operating system 44 inserts the new node such that the hierarchical arrangement of nodes is maintained with respect to the session timeout value of the subset of communication sessions with which each respective node is associated. In this way, operating system 44 generates and maintains the nodes of prioritized data structure 49 in an ordered arrangement from a highest priority node corresponding to a shortest respective session timeout value to a lowest priority node corresponding to a longest respective session timeout value.

When operating system 44 determines that a node of prioritized data structure 49 corresponds to the session timeout value ("YES" branch of 96), operating system 44 determines whether the communication session (e.g., socket) is associated with the node (100). That is, each node of prioritized data structure 49 corresponds to a subset of one or more communication sessions having a common session timeout value that is equal to the session timeout value with which the node is associated. Operating system 44 determines whether the communication session is included in the subset of communication sessions associated with the node. When operating system 44 determines that the communications session is not included in the subset of communication sessions associated with the node ("NO" branch of 100), operating system 44 inserts the communication session into the sub-list of communication sessions associated with the node (102). Operating system 44 inserts the communication session into the sub-list of sessions associated with the node such that the sub-list of communication sessions is ordered in accordance with a length of time since a last transmission on each communication session. For example, operating system 44 may insert the new session at the end of the sub-list in response to determining that the new communication session is associated with a most recent outbound communication as compared to the other sessions of the sub-list.

When operating system 44 determines that the communication session is included in the subset of sessions associated with the node, operating system 44 updates the sub-list of communication sessions associated with the node such that the sub-list of sessions is arranged in accordance with a length of time since a last transmission on each communication session (104). For example, operating system 44 may order the subset of communication sessions from a highest priority communication session corresponding to a longest time since the last transmission on the communication session to a lowest priority communication session corresponding to a shortest time since the last transmission on the communication session. Although not shown in FIG. 4, operating system 44 updates the prioritized data structure to remove sessions and nodes up receiving an indication from the primary routing engine that a communication session has been torn down.

In this way, operating system 44 generates a prioritized data structure that includes a plurality of hierarchically arranged nodes, each of the nodes associated with a different subset of communication sessions having a common session timeout value. The nodes are ordered from a highest priority node corresponding to a shortest respective session timeout value to a lowest priority node corresponding to a longest respective session timeout value. Operating system 44 orders each subset of communication sessions in accordance with a length of time since a last transmission on each communication session. The ordered arrangement includes an ordering from a highest priority communication session corresponding to a longest time since the last transmission on the communication session to a lowest priority communication session corresponding to a shortest time since the last transmission on the communication session. In addition, operating system 44 maintains the ordered arrangement of nodes and associated communication sessions as operating system 44 receives replicated communication session information from the primary routing engine.

Figure 5:
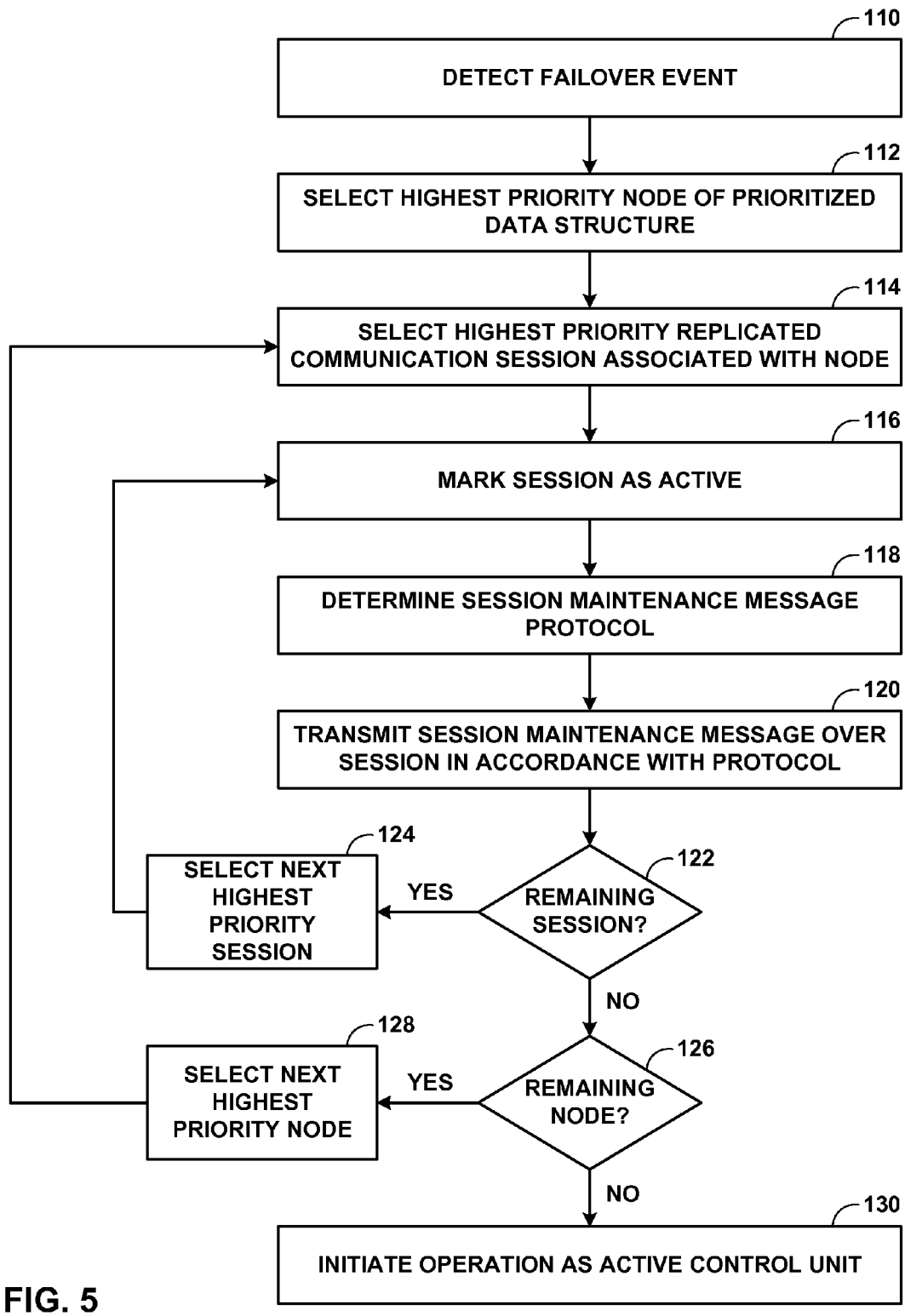
FIG. 5 is a flow diagram illustrating example operations for transmitting session maintenance messages in accordance with a prioritized data structure to perform graceful switchover from a primary control unit to a secondary control unit of a network device in accordance with techniques described herein.

FIG. 5 is a flow diagram illustrating example operations for transmitting session maintenance messages in accordance with a prioritized data structure to perform graceful switchover from a primary control unit to a secondary control unit of a network device in accordance with techniques described herein. For purposes of illustration only, the example operations are described below within the context of router 20, as shown in FIG. 2.

Secondary routing engine 36 may detect a failover event that causes the router 20 to failover from primary routing engine 22 to secondary routing engine 36 (110). For example, primary routing engine 22 may transmit a heartbeat signal to secondary routing engine 36 using out of band communication mechanism 31 or other inter-component communication mechanism. In certain examples, secondary routing engine 36 may determine the failover event as a failure to receive the heartbeat signal from primary routing engine 22 for a threshold amount of time, such as ten milliseconds, fifty milliseconds, one hundred milliseconds, five hundred milliseconds, or other threshold amounts of time.

In response to detecting the failover event, operating system 44 of secondary routing engine 36 may intervene on behalf of applications 40 (e.g., on a high priority thread of operating system 44) and may traverse prioritized data structure 49 to select a highest priority node of prioritized data structure 49 (112). For example, operating system 44 may maintain prioritized data structure 49 to include a plurality of hierarchically arranged nodes, each of the nodes associated with a different subset of communication sessions (e.g., sockets) having a common session timeout value. The hierarchical arrangement of nodes may include an ordered arrangement of the nodes in accordance with the common session timeout value of the subset of communication sessions with which each respective node is associated. For instance, the ordered arrangement may include an ordering from a highest priority node corresponding to a shortest respective session timeout value to a lowest priority node corresponding to a longest respective session timeout value. Operating system 44 may select the highest priority node associated with the shortest respective session timeout value.

Operating system 44 may select the highest priority communication session associated with the node (114). For example, operating system 44 may maintain prioritized data structure 49 such that the subset of one or more communication sessions with which each node is associated is ordered in accordance with a length of time since a last transmission on each communication session. The ordered arrangement of communication sessions may include an ordering from a highest priority communication session corresponding to a longest time since the last transmission on the communication session to a lowest priority communication session corresponding to a shortest time since the last transmission on the communication session. Operating system 44 may select the highest priority communication session associated with the longest time since the last transmission on the communication session.

However, while the example of FIG. 5 is discussed, for purposes of clarity, with respect to selecting nodes and communication sessions associated with each node, in some examples operating system 44 may not explicitly select any particular node or communication session of prioritized data structure 49. That is, in certain examples, operating system 44 may simply traverse prioritized data structure 49, whereby the ordered arrangement of prioritized data structure 49 causes operating system 44 to traverse prioritized data structure 49 from a highest priority node to a lowest priority node. Similarly, operating system 44 may simply traverse the sub-list of communication sessions associated with each node, the ordered arrangement of the sub-list of communication sessions causing operating system 44 to traverse the sub-list from a highest priority communication session to a lowest priority communication session.

Operating system 44 may mark the communication session (e.g., socket) as an active communication session (116). For instance, operating system 44 may modify an active/backup flag associated with a socket in the logical data structure of replicated sockets 46 to identify the socket as an active socket. Operating system 44 may determine a session maintenance message protocol associated with the communication session (118). In one example, upon receiving replicated socket information corresponding to a new communication session, routing process 42 passes a predefined identifier of the session maintenance message protocol, such as a predefined string, integer value, or other identifier, to replicated sockets 46 to uniquely identify the session maintenance message protocol associated with the socket. Examples of such session maintenance message protocols include, but are not limited to, BGP KEEPALIVE, PIM Hello, OSPF Hello, IS-IS Hello, LDP Hello, and the like.

Operating system 44 transmits a session maintenance message over the application-level communication session in accordance with the identified session maintenance protocol (120). Operating system 44 determines whether any remaining communication sessions are included in the subset of communication sessions associated with the node (122). For example, in examples where operating system 44 maintains the subset of communication sessions as a linked list, operating system 44 may determine that no communication sessions remain in the subset when a next-node pointer of the linked list corresponds to a NULL value. When operating system 44 determines that an unprocessed communication session remains in the subset ("YES" branch of 122), operating system 44 selects the next highest priority session of the subset (124), marks the session as active (116), determines the session maintenance message protocol associated with the communication session (118), and transmits a session maintenance message over the communication session in accordance with the identified protocol (120).

When operating system 44 determines that no unprocessed communication session remains in the subset of communication sessions associated with the node ("NO" branch of 122), operating system 44 determines whether any unprocessed nodes remain in the hierarchical arrangement of nodes (126). For instance, in examples where operating system 44 maintains the plurality of hierarchically arranged nodes as a linked list, operating system 44 may determine that no unprocessed nodes remain in the list when a next-node pointer of the linked list corresponds to a NULL value. When operating system 44 determines that an unprocessed node remains in the list, operating system 44 selects the next highest priority node (128), selects the highest priority replicated communication session associated with the node (114), and proceeds with operations 116-124 until operating system 44 transmits a session maintenance message over each communication session associated with the node.

When operating system 44 determines that no unprocessed nodes remain in the hierarchically arranged list of nodes ("NO" branch of 126), secondary routing engine 36 initiates operation as an active control unit of router 20 (130). That is, applications 40 executing one or more routing protocols, such as routing process 42, assume functional responsibility for packet forwarding and transmission of session maintenance messages. In this way, secondary routing engine 36 assumes active functional responsibility for processing packets received over inbound links 54 and transmitting forwarding packets and session maintenance messages over outbound links 56 in accordance with one or more routing protocols executed by applications 40.

According to techniques described herein, a network device, such as a router, may perform graceful switchover between control units, thereby achieving non-stop routing. In the event of a failover, a router implementing these techniques may be able to continue to forward packets without downtime and in a manner that avoids routing session reestablishment, thus avoiding route flapping by peer routers.

Techniques described herein may be performed in hardware, software, firmware, or any combination thereof. For example, techniques described herein may be performed by an application specific integrated circuit (ASIC). Techniques described herein may also be embodied in a computer-readable medium containing instructions. Instructions embedded in a computer-readable medium may cause a programmable processor, or other processor, to perform the techniques, e.g. when the instructions are executed. A computer-readable medium may be a computer-readable storage medium. Computer-readable storage media may include, for example, random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or any other computer-readable media.

Various examples have been described. These and other examples are within the scope of the following claims.

The invention claimed is:

1. A method comprising:
maintaining, with a secondary control unit of a network device, a prioritized data structure having a plurality of hierarchically arranged nodes, each of the nodes associated with a different subset of application-level communication sessions having a common session timeout value, wherein the nodes of the prioritized data structure are maintained in an ordered arrangement in accordance with the common session timeout values of the respective subset of the communication sessions with which each node is associated;
detecting, with the secondary control unit of a network device, a failover event that causes the network device to failover from a primary control unit of the network device to the secondary control unit; and
in response to detecting the failover event, sending, with an operating system of the secondary control unit, a session maintenance message on each of the plurality of application-level communication sessions in accordance with the prioritized data structure.

2. The method of claim 1,
wherein the ordered arrangement of nodes comprises an ordering from a highest priority node corresponding to a shortest respective session timeout value to a lowest priority node corresponding to a longest respective session timeout value, and
wherein sending the session maintenance message on each of the plurality of application-level communication sessions in accordance with the prioritized data structure comprises sending the session maintenance message on each of the plurality of application-level communication sessions in order from the highest priority node to the lowest priority node.

3. The method of claim 1, further comprising:
receiving, with the secondary control unit and from the primary control unit, replicated communication session information, wherein the replicated communication session information specifies a new session timeout value that is different than each of the common session timeout values with which the plurality of hierarchically arranged nodes are associated,
wherein maintaining the hierarchically arranged nodes of the prioritized data structure in the ordered arrangement further comprises generating a new node within the prioritized data structure corresponding to the new session timeout value such that the ordered arrangement of nodes with respect to the common session timeout value is maintained.

4. The method of claim 1, further comprising:
for each respective node of the hierarchically arranged nodes, arranging, with the secondary control unit, the subset of the communication sessions with which the respective node is associated in an ordered arrangement of communication sessions in accordance with a length of time since a last transmission on each communication session from the subset of communication sessions.

5. The method of claim 4,
wherein the ordered arrangement of communication sessions comprises an ordering from a highest priority communication session corresponding to a longest time since the last transmission on the communication session to a lowest priority communication session corresponding to a shortest time since the last transmission on the communication session, and wherein sending the session maintenance message on each of the plurality of application-level communication sessions in accordance with the prioritized data structure comprises sending the session maintenance message on each of the plurality of application-level communication sessions in order from the highest priority communication session to the lowest priority communication session.

6. The method of claim 5, further comprising:

receiving, with the secondary control unit and from the primary control unit, replicated communication session information, wherein the replicated communication session information includes an indication of a time of a last transmission over the communication session; and identifying the subset of communication sessions associated with the replicated communication session information, wherein arranging the subset of the communication sessions in the ordered arrangement of communication sessions further comprises arranging, based at least in part on the indication of the time of the last transmission of the replicated communication session information, the subset of communication sessions such that the replicated communication session corresponds to the lowest priority communication session.

7. The method of claim 5, further comprising:

traversing, with the operating system of the secondary control unit, the plurality of hierarchically arranged nodes of the prioritized data structure in order from the highest priority node to the lowest priority node; and for each respective node from the plurality of hierarchically arranged nodes:

traversing the subset of communication sessions with which the respective node is associated in order from the highest priority communication session to the lowest priority communication session; and for each respective communication session from the subset of communication sessions:

marking the communication session as an active communication session; and sending the session maintenance message on the communication session.

8. The method of claim 1, wherein sending the session maintenance message on each of the plurality of application-level communication sessions further comprises sending the session maintenance message on each respective application-level communication session in accordance with a communication protocol associated with the respective application-level communication session.

9. A network device comprising:

a plurality of interface cards to send and receive packets over a network; and a primary control unit of the network device and a secondary control unit of the network device configured to maintain a prioritized data structure having a plurality of hierarchically arranged nodes, each of the nodes associated with a different subset of application-level communication sessions having a common session timeout value, wherein the nodes of the prioritized data structure are maintained in an ordered arrangement in accordance with the common session timeout values of the different subsets of the communication sessions with which each node is associated, wherein an operating system of the secondary control unit is configured to detect a failover event that causes the network device to failover from the primary control unit to the secondary control unit and to send, in response to detecting the failover event, a session maintenance message on each of the plurality of application-level communication sessions in accordance with the prioritized data structure.

10. The network device of claim 9, wherein the ordered arrangement of nodes comprises an ordering from a highest priority node corresponding to a shortest respective session timeout value to a lowest priority node corresponding to a longest respective session timeout value, and wherein the operating system is further configured to send the session maintenance message on each of the plurality of application-level communication sessions in order from the highest priority node to the lowest priority node.

11. The network device of claim 9, wherein the secondary control unit is configured to:

receive replicated communication session information that specifies a new session timeout value that is different than each of the common session timeout values with which the plurality of hierarchically arranged nodes are associated; and generate a new node within the prioritized data structure corresponding to the new session timeout value such that the ordered arrangement of nodes with respect to the common session timeout value is maintained.

12. The network device of claim 9, wherein the secondary control unit is further configured to arrange the subset of the communication sessions with which the respective node is associated in an ordered arrangement of communication sessions in accordance with a length of time since a last transmission on each communication session from the subset of communication sessions.

13. The network device of claim 12, wherein the ordered arrangement of communication sessions comprises an ordering from a highest priority communication session corresponding to a longest time since the last transmission on the communication session to a lowest priority communication session corresponding to a shortest time since the last transmission on the communication session, and wherein the operating system is further configured to send the session maintenance message on each of the plurality of application-level communication sessions in order from the highest priority communication session to the lowest priority communication session.

14. The network device of claim 13, wherein the secondary control unit is further configured to:

receive replicated communication session information from the primary control unit, wherein the replicated communication session information includes an indication of a time of a last transmission over the communication session; and identify the subset of communication sessions associated with the replicated communication session information, wherein arranging the subset of the communication sessions in the ordered arrangement of communication sessions further comprises arranging, based at least in part on the indication of the time of the last transmission of the replicated communication session information, the subset of communication sessions such that the replicated communication session corresponds to the lowest priority communication session.

15. The network device of claim 13, wherein the operating system of the secondary control unit is further configured to:
traverse the plurality of hierarchically arranged nodes of the prioritized data structure in order from the highest priority node to the lowest priority node; and
for each respective node from the plurality of hierarchically arranged nodes:
traverse the subset of communication sessions with which the respective node is associated in order from the highest priority communication session to the lowest priority communication session; and
for each respective communication session from the subset of communication sessions:
mark the communication session as an active communication session; and
send the session maintenance message on the communication session.

16. The network device of claim 9, wherein the operating system is further configured to send the session maintenance message on each respective application-level communication session in accordance with a communication protocol associated with the respective application-level communication session.

17. A non-transitory computer-readable storage medium comprising instructions that, when executed, cause at least one processor of a network device to:
maintain, with a secondary control unit of the network device, a prioritized data structure having a plurality of hierarchically arranged nodes, each of the nodes associated with a different subset of application-level communication sessions having a common session timeout value, wherein the nodes of the prioritized data structure are maintained in an ordered arrangement in accordance with the common session timeout values of the respective subset of the communication sessions with which each node is associated;
detect, with the secondary control unit of the network device, a failover event that causes the network device to failover from a primary control unit of the network device to the secondary control unit; and
in response to detecting the failover event, send, with an operating system of the secondary control unit, a session maintenance message on each of the plurality of application-level communication sessions in accordance with the prioritized data structure.

18. The non-transitory computer-readable storage medium of claim 17, wherein the instructions to maintain the hierarchically arranged nodes of the prioritized data structure in the ordered arrangement of nodes comprise instructions to maintain the hierarchically arranged nodes of the prioritized data structure in an ordering from a highest priority node corresponding to a shortest respective session timeout value to a lowest priority node corresponding to a longest respective session timeout value, and
wherein the instructions to send the session maintenance message on each of the plurality of application-level communication sessions in accordance with the prioritized data structure comprise instructions to send the session maintenance message on each of the plurality of application-level communication sessions in order from the highest priority node to the lowest priority node.

19. The non-transitory computer-readable storage medium of claim 17, further comprising instructions that, when executed, cause the at least one processor to arrange, with the secondary control unit and for each respective node of the hierarchically arranged nodes, the subset of the communication sessions with which the respective node is associated in an ordered arrangement of communication sessions in accordance with a length of time since a last transmission on each communication session from the subset of communication sessions.

20. The non-transitory computer-readable storage medium of claim 19,
wherein the instructions to maintain ordered arrangement of communication sessions comprise instructions to maintain the ordered arrangement in an ordering from a highest priority communication session corresponding to a longest time since the last transmission on the communication session to a lowest priority communication session corresponding to a shortest time since the last transmission on the communication session, and
wherein the instructions to send the session maintenance message on each of the plurality of application-level communication sessions in accordance with the prioritized data structure comprise instructions to send the session maintenance message on each of the plurality of application-level communication sessions in order from the highest priority communication session to the lowest priority communication session.

21. The non-transitory computer-readable storage medium of claim 20, further comprising instructions that, when executed, cause the at least one processor to:
traverse, with the operating system of the secondary control unit, the plurality of hierarchically arranged nodes of the prioritized data structure in order from the highest priority node to the lowest priority node; and
for each respective node from the plurality of hierarchically arranged nodes:
traverse the subset of communication sessions with which the respective node is associated in order from the highest priority communication session to the lowest priority communication session; and
for each respective communication session from the subset of communication sessions:
mark the communication session as an active communication session; and
send the session maintenance message on the communication session.

* * * * *